United States Patent Office 3,165,492
Patented Jan. 12, 1965

3,165,492
SOLID POLY-α-MONO-OLEFIN CONTAINING N,N'-ALKYLENE BIS AMIDES
Clarence E. Tholstrup and Alan Bell, Kingsport, Tenn., assignors to Eastman Kodak Company, Rochester, N.Y., a corporation of New Jersey
No Drawing. Filed Oct. 14, 1959, Ser. No. 846,248
10 Claims. (Cl. 260—32.6)

This invention relates to poly-α-mono-olefin compositions of improved properties. In a specific aspect this invention relates to poly-α-mono-olefin compositions and articles made therefrom having improved properties with respect to blocking and coefficient of friction.

It has been known for some time that poly-α-mono-olefins such as ethylene can be polymerized under suitable conditions to form polymers that can be used in the formation of a variety of objects. One of the undesirable drawbacks of thin films of poly-α-mono-olefins such as polyethylene and polypropylene is their high film-to-film coefficient of friction which is often sufficiently high to prevent the feeding of single sheets of the polymer to packaging equipment. Since a poly-α-mono-olefin such as ethylene is frequently used as a packaging material, it is desirable that this property be improved. Another disadvantage of thin films of poly-α-mono-olefin is their tendency to block. Blocking is the adherence of two or more film surfaces to each other when stacked under pressure. It is apparent that when poly-α-mono-olefins such as polyethylene, polypropylene and the like are to be employed in many of their known uses, blocking of thin sheets of the polymer must be either eliminated or greatly reduced.

In accordance with U.S. Patent No. 2,765,293, it has been shown that an N,N'-alkylene bisamide, namely ethylene bisstearamide, can be added to polyethylene in order to provide polymer compositions which resist splitting under biaxial stress when subjected to polar organic media. However, in order to markedly reduce the film-to-film coefficient of friction of such a composition, it is necessary to use another amide, i.e., oleamide, in conjunction with the above-mentioned N,N'-alkylene bisamide as shown in U.S. Patent 2,770,609.

It has now been discovered in accordance with this invention, that a small amount of specific N,N'-alkylene bisamides, e.g., N,N'-alkylene bisoleamide, may be used to markedly reduce the film-to-film coefficient of friction of poly-α-mono-olefin compositions such as polyethylene without the use of additional modifying agents.

Accordingly, it is an object of this invention to provide a plastic composition based on poly-α-mono-olefin which possesses markedly reduced film-to-film coefficient of friction.

It is another object of this invention to provide poly-α-mono-olefin compositions which upon conversion into sheets and films possess greatly improved resistance to blocking.

It is a further object of this invention to provide poly-α-mono-olefin compositions of improved blocking and coefficient of friction without affecting the properties of the polymer compositions such as transparency, haze, color and the like.

Other objects and advantages of this invention will be apparent from the detailed description appearing hereinbelow.

The above objects of this invention are accomplished by providing a plastic composition comprising solid plastic, high molecular weight poly-α-mono-olefin and a small amount of an N,N'-alkylene bisamide having the following structural formula:

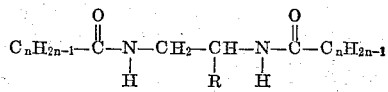

where $n$ is an integer from 17 to 21 and R is a member selected from the group consisting of hydrogen and alkyl. Suitable alkyl groups which may be present in the above-described compounds include methyl, ethyl, propyl, isopropyl, hexyl, octyl, nonyl, etc. Examples of the acyl radicals represented by

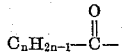

in the above formula are those derived from acids such as:

Δ⁹-oleic acid [$C_{17}H_{33}CO$—]

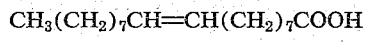

Δ⁹-eicosenoic acid (gadoleic acid) [$C_{19}H_{37}CO$—]

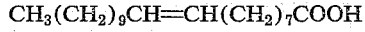

Δ¹¹-eicosenoic acid [$C_{19}H_{37}CO$—]

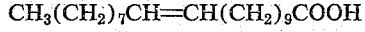

Δ¹¹-docosenoic acid (cetoleic acid) [$C_{21}H_{41}CO$—]

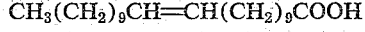

Δ¹³-docosenoic acid (erucic acid) [$C_{21}H_{41}CO$—]

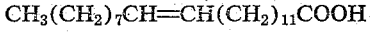

The compositions of this invention can be used to prepare poly-α-mono-olefin articles in the form of films, sheets, coatings and other structures where lower blocking tendencies and lower coefficients of friction are desirable.

The compositions of this invention can be prepared by any method suitable for insuring a uniform mixture of the poly-α-mono-olefin and the additive in the final fabricated article. Suitable methods include addition of the bisamide as a solid or in solution or in the form of a slurry in water or other known solvent to the poly-α-mono-olefin in either the dry or molding powder form followed by drying and tumbling of the mixture. The bisamide can also be incorporated in the poly-α-mono-olefin by melt blending the ingredients in conventional apparatus such as a mixer or on heat rollers. In some instances it is desirable to form a concentrate of the bisamide in poly-α-mono-olefin, and this in turn be blended with poly-α-mono-olefin molding powders by tumbling or other suitable methods.

In general, the amount of N,N'-alkylene bisamide used in the plastic polymer composition to achieve the desired reduction in the coefficient of friction is within the range of .0001% to 5% by weight of polymer. Percentages of .001 to 3% have been found to give satisfactory results while percentages of .01 to 2% are preferred. It is, of course, possible to use amounts in excess of 5%, but no particular advantages are derived therefrom.

The chief advantage of the poly-α-mono-olefin compositions containing the specific bisamides set forth above is that these compositions allow the production of transparent poly-α-mono-olefin films and other shaped articles having greatly reduced film-to-film coefficient of friction. Another advantage achieved by the polymer compositions of this invention is that they exhibit reduced tendency toward blocking.

Although the compositions of this invention are composed essentially of poly-α-mono-olefins such as polyethylene, polypropylene and the like and small amounts of a specific N,N'-alkylene bisamide, the compositions may also contain small amounts of other desirable additives such as high melting waxes, antioxidants, dyes and pigments for coloring the polymer, lubricants and antistatic agents, provided the additional ingredients are not present in amounts sufficient to alter the desirable properties of the polyethylene composition adversely.

The following examples illustrate specific embodiments of this invention. All parts are given by weight unless otherwise specified.

In the table are given examples of N,N'-alkylene bisamides compounded in polyethylene. In considering these data, it is important to recognize that films having coefficient of friction in excess of 0.60 tend to stick together and cause difficulty when used with automatic packaging machinery. Those having coefficients below 0.6 and desirably below 0.4 are considered to have satisfactory slip for most applications. In obtaining the data for these examples, the additives were dissolved in isopropanol and tumbled with the polyethylene pellets until the solvent evaporated. These coated pellets were then extruded into lay-flat tubular film upon which the tests listed were carried out. The polyethylene used had a molecular weight of about 22,000 as determined by measuring the viscosity of dilute solution of the polymer by a method similar to that of J. Harris J. Polymer Science, volume 8, page 353, 1952.

The coefficient of friction of the polyethylene film thus prepared was measured on a strip of film approximately 3 ft. long. Another sample of the film was carefully fastened around a flat-bottom block (referred to as "boat") making sure that there were no wrinkles or creases on the surface of the film. A long strip of film was then started through a wringer which was used to pull the film. The wringer motor was cut off and the boat was placed flat side down on the piece of film and connected to a load measuring device. The wringer motor was then turned on, and as the film was pulled underneath the boat at 10 ft. per minute, the load measuring device indicated the resistance which the boat was offering to the film being pulled beneath it. This value was recorded. This procedure was repeated five times with each sample of film and an average value taken. The coefficient of friction was calculated by dividing the weight of the boat (466 g.) into the average load absorbed during the test.

*Table I*

| Compound [1] | Percent | Coefficient of Friction [2] |
|---|---|---|
| Control | 0 | >0.6 |
| N,N'-Propylene bisoleamide | 0.1 | 0.3 |
| N,N'-Ethylene bisoleamide | 0.1 | 0.35 |
| N,N'-Ethylene biserucamide | 0.1 | 0.3 |
| N,N'-Ethylene bisstearamide | 0.2 | >0.6 |

[1] The polyethylene used in these tests was made by the high pressure process with a melt index about 7.
[2] Polyethylene films with coefficient of friction values of 0.6 or greater are inferior to those films of a lower value in regard to slippage.

From the above data it is quite obvious that the compounds of our invention are exceedingly effective at low concentrations, whereas N,N'-alkylene bisamides such as ethylene bisstearamide would not pass this test even though used at two times the concentration. Although the above example uses polyethylene as the poly-α-mono-olefin component, it is to be understood that the N,N'-alkylene bisamides of our invention will improve the coefficient of friction of any of the well known poly-α-mono-olefins such as polypropylene, n-butylene, 1-butylene, 1-pentene, 1-decene, styrene and the like.

The poly-α-mono-olefins employed in practicing this invention can be any of the solid high molecular weight polymers that are useful in packaging materials or for extrusion into thin films, sheets, tubes and the like. The invention is particularly applicable to polyethylene which can be cast or molded into films, sheets, rods, tubes and other shaped articles. Other uses for the compositions of this invention are for coating paper, cloth, wire, metal foil, glass fibers, synthetic and natural textiles and other substrates.

Although the invention has been described in considerable detail with reference to certain perferred embodiments thereof, it will be understood that variations and modifications can be effected without departing from the spirit and scope of the invention as described hereinabove and as defined in the appended claims.

We claim:

1. A plastic composition comprising solid poly-α-mono-olefin and .0001 to 5% by weight of an N,N'-alkylene bisamide of the formula:

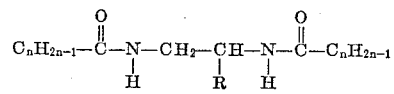

where $n$ is an integer from 17 to 21 and R is alkyl.

2. A plastic composition comprising solid poly-α-mono-olefin and .0001 to 5% by weight of an N,N'-alkylene bisamide of the formula:

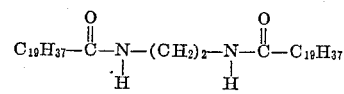

3. A plastic composition comprising solid poly-α-mono-olefin and .0001 to 5% by weight of an N,N'-alkylene bisamide of the formula:

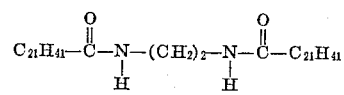

4. A plastic composition comprising solid poly-α-mono-olefin and .0001 to 5% by weight of an N,N'-alkylene bisamide of the formula:

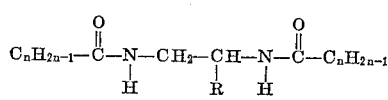

where $n$ is an integer from 17 to 21 and R is methyl.

5. A plastic composition comprising solid poly-α-mono-olefin and .0001 to 5% by weight of an N,N'-alkylene bisamide of the formula:

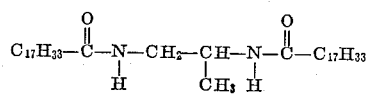

6. A plastic film comprising solid poly-α-mono-olefin and .0001 to 5% by weight of an N,N'-alkylene bisamide of the formula:

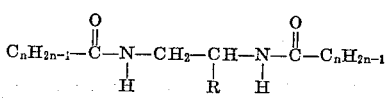

where $n$ is an integer from 17 to 21 and R is alkyl.

7. A plastic film comprising solid poly-α-mono-olefin and .0001 to 5% by weight of an N,N′-alkylene bisamide of the formula:

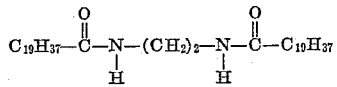

8. A plastic film comprising solid poly-α-mono-olefin and .0001 to 5% by weight of an N,N′-alkylene bisamide of the formula:

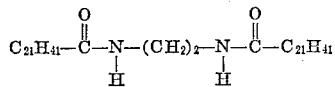

9. A plastic film comprising solid poly-α-mono-olefin and .0001 to 5% by weight of an N,N′-alkylene bisamide of the formula:

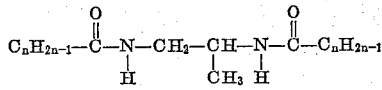

10. A plastic film comprising solid poly-α-mono-olefin and .0001 to 5% by weight of an N,N′-alkylene bisoleamide of the formula:

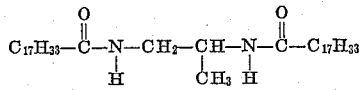

References Cited in the file of this patent

UNITED STATES PATENTS

| | | |
|---|---|---|
| 2,765,293 | Happoldt | Oct. 2, 1956 |
| 2,770,609 | Symonds | Nov. 13, 1956 |
| 3,021,296 | Ammondson | Feb. 13, 1962 |

FOREIGN PATENTS

| | | |
|---|---|---|
| 1,132,791 | France | Mar. 15, 1957 |